April 14, 1925.
D. S. FOX
REAMER
Filed Aug. 4, 1921
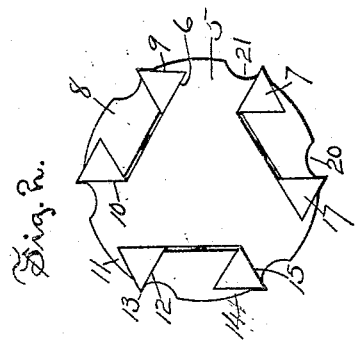
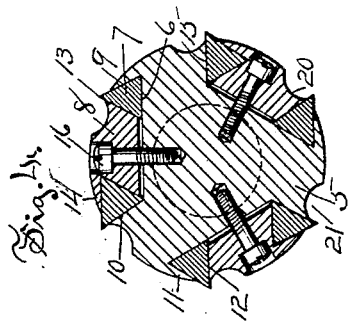
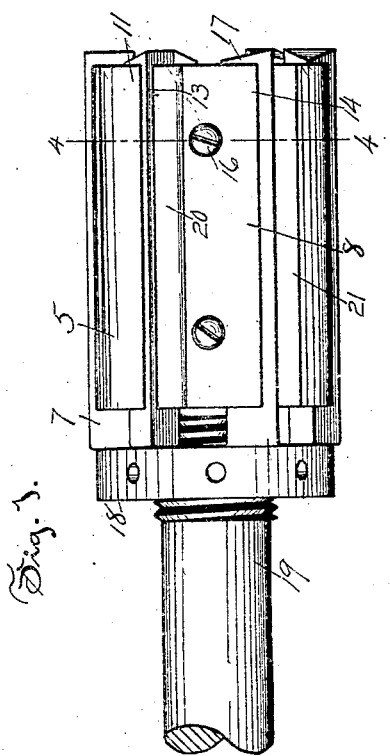
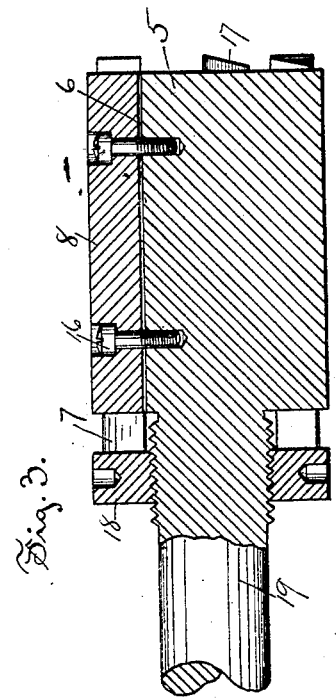
INVENTOR:
Daniel S. Fox.
BY
Arthur Jenkins,
ATTORNEY.

Patented Apr. 14, 1925.

1,533,314

UNITED STATES PATENT OFFICE.

DANIEL S. FOX, OF IVORYTON, CONNECTICUT.

REAMER.

Application filed August 4, 1921. Serial No. 489,718.

*To all whom it may concern:*

Be it known that I, DANIEL S. FOX, a citizen of the United States, and a resident of Ivoryton, in the county of Middlesex and State of Connecticut, have invented a new and Improved Reamer, of which the following is a specification.

My invention relates to that class of tools employed for increasing the size of a hole or for smoothing its inner surface, and an object of my invention, among others, is to provide a tool of this class that shall be simple in its construction and particularly efficient in its operation.

A form of reamer embodying my invention and in the construction and use of which the objects herein set out, as well as others, may be attained, is illustrated in the accompanying drawings, in which—

Figure 1 is a side view of my improved reamer.

Figure 2 is an end view of the same.

Figure 3 is a view in central longitudinal section through my improved reamer.

Figure 4 is a view in cross section through the same on plane denoted by dotted line 4—4 of Figure 1.

In the accompanying drawings the numeral 5 indicates the body of my improved reamer that is composed of any suitable metal and that is preferably round as to its general shape in cross section. A number of grooves 6 are formed in the outer surface of the body, extending lengthwise thereof, preferably for its full length, these grooves being arranged to receive reaming cutters 7 and clamps 8 therefor.

This improved reamer is especially designed to receive reaming cutters or reamers of triangular shape in cross section, and the grooves are formed to receive such triangular shaped reamers in the preferred form of construction, each groove being arranged to receive two of the reaming cutters.

In the special arrangement herein shown and described I provide three of the grooves 6 evenly spaced about the outer surface of the body and arranged to receive the reaming cutters at opposite sides, the width of these grooves being such, as compared with the circumference that the six tools will be evenly spaced about the circumference of the body.

The grooves 6 and the clamps 8 are so formed that triangularly-shaped cutter receiving recesses 9—10 are formed in each groove 6. In effecting this purpose in the structure herein shown the grooves 6 are each formed with oppositely inclined surfaces arranged in substantially parallel relation whereby a tool receiving lip 11 is located at one side of the groove, which lip, however, does not appear at the opposite side of the groove. This lip receives one of the sides of a triangularly shaped cutter 7 and a beveled tool receiving edge 12 on a clamp 8 receives the opposite beveled edge of the triangularly shaped tool, the cutting edge 13 of a cutter projecting beyond the edges of the lip 11 and the beveled edge 12 for cutting purposes. The lip on the body and on the clamp form one side of the tool receiving groove, the bottom of these grooves being formed on the clamp by the edge adjacent to the lip and on the body by a part of the bottom of groove 6 adjacent to the lip.

The recess at the opposite side of a groove 6 is formed by a tool receiving lip 14 on a clamp 8 that receives one of the beveled sides of a triangularly shaped reaming cutter, the opposite side of the recess being formed by the beveled edge 15 of the groove 6, all as clearly shown in Figure 4 of the drawings, a space being left between the edge of the lip 14 and the beveled edge 15 through which the cutting edge of a reaming cutter 7 projects.

The tool clamps are each held in place as by means of a screw or screws 16 projecting through the clamps into the body 5. The reamers project at the working end of the body and are formed with cutting edges 17, and an adjusting and holding nut 18 is mounted on a screw threaded shank 19 projecting from the opposite end of the body and formed to be received within the socket of a tool holding spindle substantially in a manner that will be readily understood.

A clearance for the chips made by the cutting tools is provided in the form of a recess at the edge of each cutting tool, such recesses 20 for one set of cutting tools being located in the clamps 8 and the recesses 21 for the other set of cutting tools being located in the outer surface of the body 5.

I claim—

1. A reamer comprising a body having a groove with a flat bottom and a sloping wall on one side at an angle to the bottom, a clamp having an edge oppositely tapered to said wall to form a recess for a triangular cutting tool, and means for securing the clamp in place.

2. A reamer comprising a body having a groove with a sloping wall, a clamp having a bottom and an edge oppositely tapered to said wall, said clamp edge, bottom and sloping wall forming a triangularly-shaped recess with a narrow opening for the projecting edge of a triangularly shaped cutting tool, and means for securing the clamp in place.

3. A reamer comprising a body having a groove with inclined parallel side walls and a flat bottom, a clamp having its opposite edges inclined to provide triangular recesses in connection with the inclined wall of the first mentioned recess; a blade positioned between the clamp and walls of the recess, and means for retaining the clamp in place.

4. A reamer comprising a body having a groove with opposite walls sloping in the same direction, a clamp having opposite edges sloping in the same direction but in a direction opposite to the slope of the walls of said groove to provide a recess for a cutting tool, and said clamp being constructed for cooperation with the recess walls and tool for retaining the tool in place.

5. A reamer comprising a body having a groove with opposite walls sloping in the same direction and with one of the walls forming a lip overhanging the groove, a clamp having opposite edges sloping in the same direction but in a direction opposite to the slope of the walls of said groove, said clamp having a lip located on its edge opposite the first mentioned lip, said sloping walls providing triangular recesses for similarly-shaped cutting tools, and means for retaining the clamp in place.

6. A reamer comprising a body having a groove extending lengthwise thereof, a clamp located in said groove and shaped to provide a tool holding recess between its opposite edges and the opposite edges of said groove; a lip on said body and a lip on said clamp, each to form one wall of a triangular tool holding recess, and a relieving recess in said clamp and a relieving recess in said body, each adjacent to the mouth of a tool holding recess.

7. In a reamer in combination with a triangularly shaped cutting tool having a cutting edge at each side corner thereof, a holder comprising a body, a groove extending along its outer surface, means to form said groove into a plurality of grooves with a narrow mouth and to retain a plurality of said tools within said grooves with a cutting edge of each of the said tools extending through the said narrow mouths, and in a cutting position with respect to said holder.

8. A reamer comprising a body having a groove extending longitudinally along its outer surface, the side walls of the groove being parallel and inclined relative to the bottom of the groove, cutting tools triangular in cross section seated in the groove flatly engaging the inclined side walls, one of the side walls constituting a lip overhanging one of the tools and a clamp in the groove having side walls engaging the adjacent faces of the tools and carrying a projecting lip overlying another side of the adjacent tool.

9. A reamer comprising a body having a groove extending longitudinally along its outer surface, the side walls of the groove being parallel and inclined relative to the bottom of the groove, cutting tools triangular in cross section seated in the groove flatly engaging the inclined side walls, one of the side walls constituting a lip overhanging one of the tools and a clamp in the groove having side walls engaging the adjacent faces of the tools and carrying a projecting lip overlying another side of the adjacent tool, the opposite edges of the clamp being parallel and extending at an angle to the body and in opposite directions to the side walls of the groove.

DANIEL S. FOX.